(No Model.)  2 Sheets—Sheet 1.

W. K. KIDDER.
GALVANIC BATTERY.

No. 310,831. Patented Jan. 13, 1885.

WITNESSES:
L. H. Longley
J. F. Ludwig

INVENTOR
William K. Kidder
BY Francis C. Bowen,
ATTORNEY.

(No Model.) 2 Sheets—Sheet 2.
W. K. KIDDER.
GALVANIC BATTERY.
No. 310,831. Patented Jan. 13, 1885.
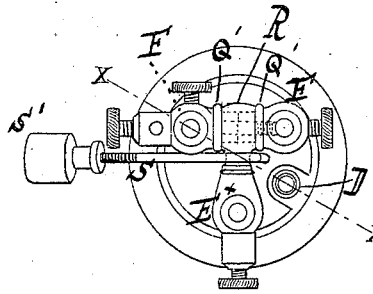
Fig. 10.
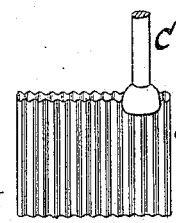
Fig. 9.
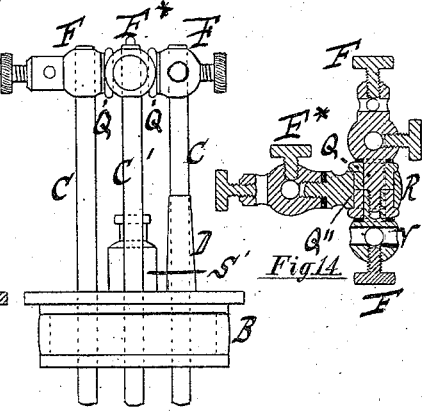
Fig. 14.
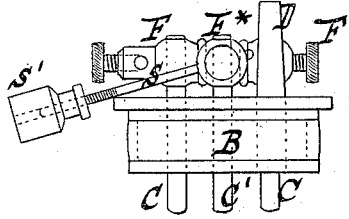
Fig. 11.
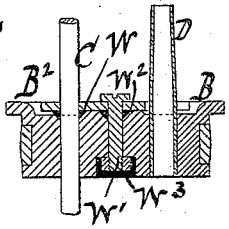
Fig. 13.
Fig. 12.
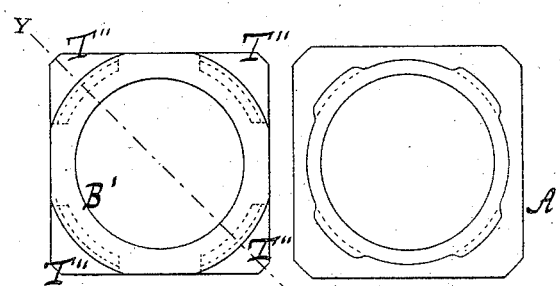
Fig. 15. Fig. 16.
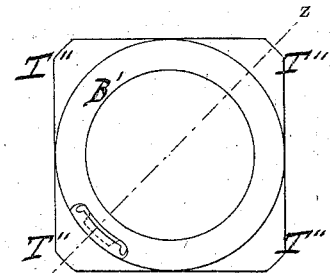
Fig. 17.
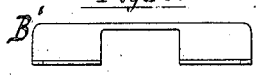
Fig. 19.
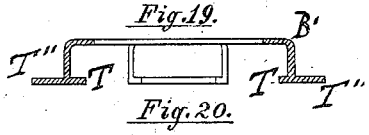
Fig. 20.
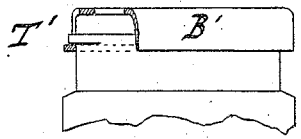
Fig. 18.
WITNESSES:
L. F. Longley
J. Ludewig
INVENTOR
William K. Kidder
BY Francis C. Bowen
ATTORNEY

UNITED STATES PATENT OFFICE.

WILLIAM K. KIDDER, OF NEW YORK, N. Y., ASSIGNOR TO THE JEROME KIDDER MANUFACTURING COMPANY, OF SAME PLACE.

GALVANIC BATTERY.

SPECIFICATION forming part of Letters Patent No. 310,831, dated January 13, 1885.

Application filed May 17, 1883. (No model.)

*To all whom it may concern:*

Be it known that I, WILLIAM K. KIDDER, a citizen of the United States, residing at New York, in the county of New York and State of New York, have invented certain new and useful Improvements in Galvanic Batteries, of which the following is a specification, reference being had therein to the accompanying drawings.

My invention relates to that class of galvanic batteries in which the battery elements are hung to slide-rods passing vertically through the stopper of a jar, to permit such elements to be raised out of the liquid when desirable.

The novel features of my battery are hereinafter fully described, and illustrated in the accompanying drawings, in which—

Figure 1:
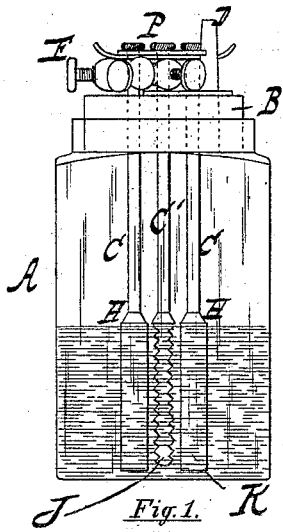
Figures 2, 7:
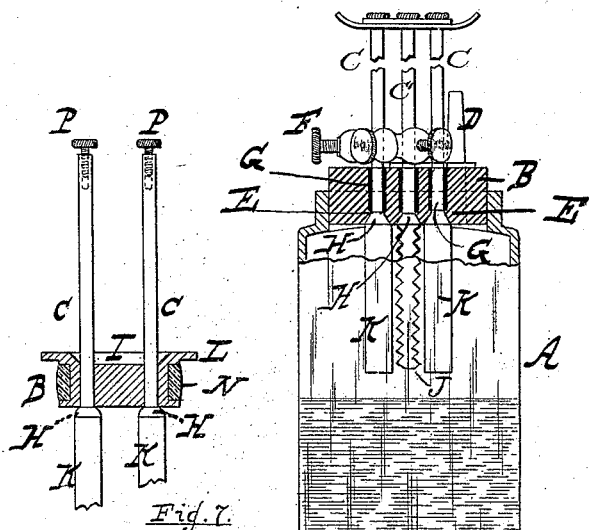
Figure 6:
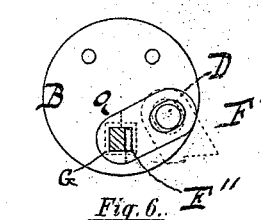
Figure 3:
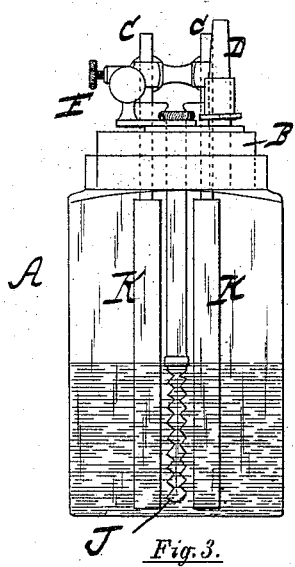
Figure 5:
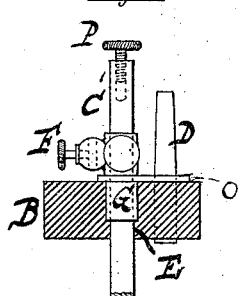
Figure 4:
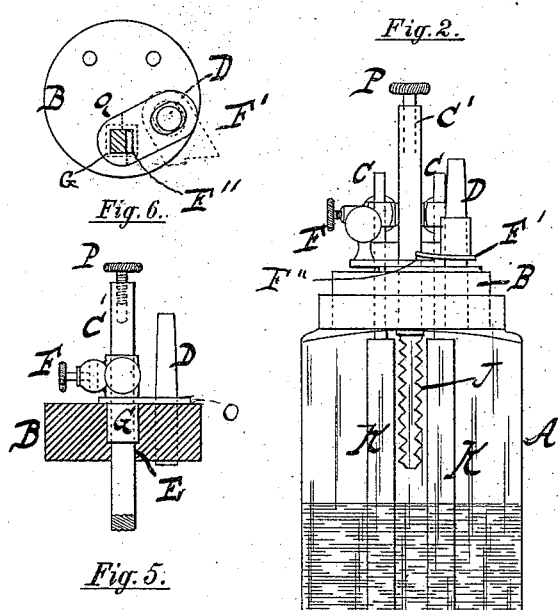
Figure 8:
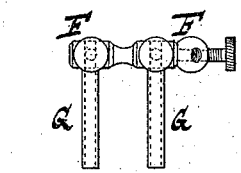

Figure 1 represents a side view. Fig. 2 is a similar view, partly in section. Fig. 3 is a similar view showing a modification in the arrangement of the slide-rods. Fig. 4 is a similar view showing one of the rods drawn to an upper position. Fig. 5 is a cross-section of the stopper detached. Fig. 6 is a plan or top view thereof. Fig. 7 illustrates a modification in the construction of the stopper. Fig. 8 is a detailed view of parts. Fig. 9 is a detail view of one of the battery elements. Fig. 10 is a top view of the stopper and its attachments. Fig. 11 is a side view thereof. Fig. 12 is a similar view showing the attachments in a raised position. Fig. 13 is a cross-section of the stopper on line $x$ $x$, Fig. 10. Fig. 14 is a horizontal section of the clamps of the stoppers. Figs. 15, 16, 17, 18, 19, 20 illustrate a fastening for the stopper.

Similar letters indicate similar parts.

The letter A designates the jar, B the stopper, and C the slide-rods, which may be square, round, or partly square and partly round. The stopper B is provided with the usual vent, D, with vertical passages E, to receive the slide-rods, and with fastenings for retaining the slide-rods in their upper position, these rods being furnished with clamps F, Figs. 1 and 2, to receive the electrical conductors. In the example shown in Figs. 4 and 6 said fastening for the rods is composed of a swinging latch, F', which is pivoted to the upper surface of the stopper, to engage with a lateral notch, F'', in the proper rod, this notch being formed at the required place to bring or hold the proper battery element out of the liquid when the latch is locked. Said latch is constructed with an inclined toothed edge, and the vent D, together with the stopper, acts as a kind of spring to hold it in engagement with the notch of the rod, when the stopper is made of rubber, the latch passing into the notch with a "clicking" noise. At the place where the rods C C' and the vent D enter the top of the stopper the latter is provided with a metallic plate, O, and when the latch F' is used this plate is provided with a slot to receive the vent, as shown in Fig. 6, so that the latter may yield to the pressure exerted thereon by the latch when it is locked. It is preferred to make the stopper B of soft rubber, and when it is made of this material the passages E are respectively furnished with a lining or bushing, G, Fig. 2, of brass or other metal, to facilitate the movement of the rods. This lining, however, does not extend entirely through the said passages, but terminates a short distance above the lower surface of stopper, as shown, and by this means the rubber composing the stopper is allowed to close on the rods at that place by its inherent elasticity, thus producing an air-joint, whereby the liquid contained in the jar is prevented from escaping by evaporation. In the example shown the battery is provided with three elements, two positive and one negative, and those linings G which are in the passages of the rods C, carrying the positive elements, are connected together by means of the proper clamp, F, as clearly shown in Fig. 8, so that both rods are brought in metallic connection with said clamp through the medium of the linings. The clamp F of the rods C', carrying the negative battery element, is loose on said rod, and is provided with a set-screw, as shown in Fig. 5, so that this clamp may be properly adjusted on the rod to hold it in its upper position—namely, by resting on the stopper. The slide-rods C C', Figs. 1, 2, and 7, are respectively provided with shoulders H at the lower end, where said rods are joined to the battery elements, and when the rods are drawn upward to raise said elements out of the liquid this shoulder impinges against the lower surface of the stopper B, and thus tends to produce an air-tight joint, besides regulating upward movement of the rods. When the stopper B is made of rubber, the shoulder H may be formed of gutta-percha; but when the stopper is made of glass or other similar material said shoulder should be formed of soft rubber, gutta-percha, or both, or other similar material. In the upper surface of the stopper B is formed a cavity, I, Fig. 7, which surrounds the passages E, so that if a liquid is poured into this cavity it thence flows into said passages, and hence the latter may be lubricated by that means when desirable or necessary. One of the battery elements (marked J) is composed of a strip of platinum or other similar material, which in this example is corrugated horizontally; but I prefer to corrugate them vertically, the remaining elements, K, being composed of zinc. Said platinum strip is doubled and attached to the proper rods at the ends, and by this means the element thus obtained is reduced in length without being comparatively diminished in its area, so that the least movement of its supporting-rod is required to draw said element from the liquid.

In Fig. 7 I have shown the stopper as being provided on the upper edge with a flange, L, which, when the stopper is put in place, overlaps the mouth of the jar, and thus serves to keep the stopper in position. When this flange L is used, the stopper is made of glass or other similar material, and may be provided with a packing-ring, N, of india-rubber below the flange; or, if desired, this ring may be omitted, in which case the mouth of the jar is lined with india-rubber.

On the upper end of each of the slide-rods C C' is arranged a set-screw, P, which serves to render the rods adjustable in length, so that when they are raised and the whole is placed in a box for transportation the lid of the box may close tightly on the rods, and thus keep the apparatus steady in position, especially when the stopper is provided with the flange L, as described.

It has been found that by the union of the metals composing the slide-rods and the battery elements, the rods being of copper or brass, or both, the acid or gas contained in the battery has a tendency to destroy the joint between the metals, thus separating the elements from the rods. This objection is overcome by the use of the shoulders H, which, being composed of gutta-percha or some other non-conducting material, prevent the access of the liquid or gas to the joint, so that these shoulders perform an additional function to closing the lower ends of the stopper-passages, as before explained.

Instead of being connected at the ends, the platinum element J may be connected to its rod C' on one of the edges, as shown in Fig. 9.

In the example shown in Figs. 10, 11, 12 the clamps F* of the slide-rods are connected together; but the clamps F, adjacent to the negative elements, are insulated from that of the positive element in the following manner: Said clamps of the negative elements are provided with a screw-coupling, Q, (see Fig. 10,) which is formed by externally threading the shank of one clamp and internally threading the shank of the other clamp to receive said externally-threaded shank, as clearly shown in Fig. 14, and which is surrounded by a sleeve, Q', of hard rubber or other insulating material. The sleeve is divided transversely into two parts, and upon it is fitted a ring, R, forming part of the clamp F* of the positive element, said ring being held in position by flanges on the ends of the sleeve. One of the clamps F is provided with a series of two or more transverse holes, V, passing entirely through it, either of which is adapted to receive the proper slide-rod C, and which are in different planes or positions relatively to each other, so that by a slight turn of said clamp one or the other of the poles may be brought into the vertical plane of the hole containing said rod in the stopper, and any variation in the position of said holes of the stopper may be compensated for. In adjusting said clamp suitable washers may be placed between it and the end of the sleeve Q', as shown in Fig. 12. The clamp F* may be connected to its supporting-ring R by a screw-thread, as shown in Fig. 14, to render the same adjustable.

On the clamp F* is hung a swinging brace, S, which, when the slide-rods are raised, is adapted to rest on the top of the stopper at the lower or free end in a substantially-vertical position, as shown in Fig. 12, for retaining said rods in their upper positions, the brace being provided with a ring or loop at the upper end to engage the proper part of the clamp. On the lower end of said brace is screwed a foot, S', which, being adjustable, serves to lengthen and shorten the brace when desirable.

In Figs. 15 to 20, inclusive, I have shown a means for locking the stopper B to the jar, consisting of a cap, B', which is provided with inwardly-projecting lips or flanges T, to engage with lugs T' on the jar. This cap T, moreover, has corner-pieces T'', whereby it is rendered substantially square in horizontal section, and thus adapted to fit snugly into a square receptacle with a square jar. It may be used for long or short stoppers by increasing it vertically.

In the example shown in Fig. 13 the stopper B is provided with a top plate, B², which serves to hold in position a washer, W, surrounding each of the rods C C C' at the top of the stopper. This plate B² is in turn held in position by a screw-bolt, W', which also is provided with a washer, W², at the top of the stopper, and a gutta-percha seal, W³, at its bottom.

I claim—

1. The combination, with the jar, its soft-rubber stopper, and the slide-rods arranged in vertical passages of the stopper for supporting the battery elements, of the metallic lining or linings arranged in said passages, to terminate above the lower surface of the stopper, thus allowing the rubber to close on the rods at that place, substantially as described.

2. The combination, with the jar and the slide-rods for supporting the battery elements, of the stopper having vertical passages to receive said rods, and having a cavity in its upper surface surrounding said passages, for the reception of a liquid to lubricate the passages, substantially as described.

3. The combination, with the jar and its stopper, having vertical passages provided with metallic linings, of the slide-rods arranged in the vertical passages of the stopper for supporting the battery elements, and provided with shoulders H, of gutta-percha or other similar material, at the junction of the rods with said elements, substantially as and for the purpose described.

4. The combination, with the jar, its stopper, and the slide-rods for supporting the battery elements, of the clamps F F* on said rods, the screw-coupling uniting the clamps F, and the insulating-sleeve surrounding said coupling and containing the clamp F*, substantially as and for the purpose described.

5. The combination, with the jar and stopper, and the slide-rods for supporting the battery elements, of the clamps F, one having a series of holes in different vertical planes, and the screw-coupling uniting said clamps, substantially as and for the purpose described.

6. The combination, with the stopper and the slide-rods, of a washer, W, to each rod, the top plate of the stopper, the screw-bolt for holding said plate, and the washer $W^2$ of the screw-bolt, substantially as and for the purpose described.

In testimony whereof I affix my signature in presence of two witnesses.

WILLIAM K. KIDDER.

Witnesses:
FRANCIS CLARE BOWEN,
P. F. MOORE.